(12) United States Patent
Takao

(10) Patent No.: US 8,029,267 B2
(45) Date of Patent: Oct. 4, 2011

(54) EJECTOR APPARATUS

(75) Inventor: Hiroshi Takao, Nagareyama (JP)

(73) Assignee: Takao Injection Mold Engineering Co., Ltd., Chiba (JP)

( * ) Notice: Subject to any disclaimer, the term of this patent is extended or adjusted under 35 U.S.C. 154(b) by 1 day.

(21) Appl. No.: 12/599,046

(22) PCT Filed: May 19, 2008

(86) PCT No.: PCT/JP2008/059135
§ 371 (c)(1),
(2), (4) Date: Nov. 6, 2009

(87) PCT Pub. No.: WO2008/143214
PCT Pub. Date: Nov. 27, 2008

(65) Prior Publication Data
US 2010/0221379 A1    Sep. 2, 2010

(30) Foreign Application Priority Data

May 17, 2007  (JP) .............................. 2007-003571 U

(51) Int. Cl.
*B29C 45/44*   (2006.01)
(52) U.S. Cl. .................. 425/444; 425/556; 425/DIG. 58
(58) Field of Classification Search .................. 425/438, 425/443, 444, 556, 577, DIG. 5, DIG. 58
See application file for complete search history.

(56) References Cited

U.S. PATENT DOCUMENTS

| | | | |
|---|---|---|---|
| 3,642,417 A * | 2/1972 | Von Holdt | 425/443 |
| 3,811,645 A * | 5/1974 | Feist | 249/68 |
| 3,905,740 A * | 9/1975 | Lovejoy | 425/438 |
| 4,854,849 A * | 8/1989 | Sudo | 425/556 |
| 5,137,442 A * | 8/1992 | Starkey | 425/438 |
| 5,219,594 A * | 6/1993 | Meyer et al. | 425/577 |
| 5,281,127 A * | 1/1994 | Ramsey | 425/556 |

(Continued)

FOREIGN PATENT DOCUMENTS

JP    61-183446 A    8/1986

(Continued)

OTHER PUBLICATIONS

International Search Report w/translation from PCT/JP2008/059135 dated Jun. 17, 2008 (4 pages).

(Continued)

*Primary Examiner* — Yogendra Gupta
*Assistant Examiner* — Emmanuel S Luk
(74) *Attorney, Agent, or Firm* — Osha • Liang LLP

(57) ABSTRACT

An ejector apparatus moves a lift core extending through a core of a component of a resin molding mold to form an undercut portion in a molded piece and is installed so as to be capable of moving obliquely with respect to the core surface in a longitudinal direction. An ejector plate is arranged between the core and a base plate below the core, so as to be capable of moving up and down. A slide path is formed in the ejector plate extending in a direction in which a lower end of the lift core makes relative horizontal movement during ascent and descent of the lift core. A slide base is movably arranged in the slide path and coupled to the lower end of the lift core. A guide rod imparts a moving force within the slide path to the lower end of the lift core during ascent and descent of the ejector plate.

7 Claims, 9 Drawing Sheets

U.S. PATENT DOCUMENTS

| | | | | |
|---|---|---|---|---|
| 5,316,467 A | * | 5/1994 | Starkey | 425/438 |
| 5,551,864 A | * | 9/1996 | Boskovic | 425/556 |
| 5,814,357 A | * | 9/1998 | Boskovic | 425/556 |
| 6,039,558 A | * | 3/2000 | Park et al. | 425/556 |
| 6,443,723 B1 | * | 9/2002 | Buttigieg | 425/214 |
| 6,491,512 B2 | * | 12/2002 | Vandenberg | 425/556 |
| 6,491,513 B1 | * | 12/2002 | Schneider | 425/577 |
| 2002/0076466 A1 | * | 6/2002 | Mowery et al. | 425/556 |
| 2005/0042322 A1 | * | 2/2005 | Takao | 425/443 |

FOREIGN PATENT DOCUMENTS

| | | |
|---|---|---|
| JP | 10-95019 A | 4/1998 |
| JP | 2000-167847 A | 6/2000 |
| JP | 2001-96590 A | 4/2001 |
| JP | 2003-191292 A | 7/2003 |
| JP | 2005-059474 A | 3/2005 |

OTHER PUBLICATIONS

English translation of Japanese Publication No. 10-095019 published on Apr. 14, 1998, 13 pages.

English translation of Japanese Publication No. 2001-096590 published on Apr. 10, 2001, 10 pages.

Partial English translation of Japanese Publication No. 61-183446 published on Aug. 16, 1986, 1 page.

English translation of Japanese Publication No. 2000-167847 published on Jun. 20, 2000, 12 pages.

English translation of Japanese Publication No. 2003-191292 published on Jul. 8, 2003, 11 pages.

* cited by examiner (a)　　　　　　　　　(b)

(a)　　　　　　　　　(b)

EJECTOR APPARATUS

CROSS-REFERENCE TO RELATED APPLICATIONS

The present application is a National Stage Application of PCT Application No. PCT/JP2008/059135 filed on May 19, 2008, which claims priority based on the Japanese Patent Application 2007-003571U, filed in Japan on May 17, 2007. Each of the above referenced PCT application and Japanese patent application are to be incorporated herein by reference.

BACKGROUND OF THE INVENTION

1. Technical Field

The present invention relates to an ejector apparatus for moving a lift core which extends through a core constituting a component of a resin molding mold to form an undercut portion in a molded piece and which is installed so as to be capable of moving obliquely with respect to the core surface and in the longitudinal direction.

2. Background Art

Conventionally, an apparatus for moving a lift core which extends obliquely through a core constituting a component of a resin molding mold to form an undercut portion in a molded piece and which is movable in the longitudinal direction, is called an ejector apparatus, an example of which is disclosed, for example, in JP 10-95019 A.

In an ejector apparatus disclosed in JP 10-95019 A, an inclination angle K° of a lift core 5 (FIG. 13) varies within any range depending on a molded piece 11, and is determined by a user who molds the molded piece using this ejector apparatus.

When fixing a lower end portion 5c of the lift core 5 to a slide base 33 to assemble the conventional ejector apparatus, the following procedure is performed such that a guide rod 38 and the lift core 5 are inclined by the same angle (K°);

First, the lower end portion 5c of the lift core 5 is inserted into an insertion hole on a top surface of a shaft coupling (also referred to as universal nut) 6, and the axial length of the lift core 5 is adjusted for the assembly procedure. Then, the slide base 33 is incorporated into an ejector plate 1.

Next, the guide rod 38 is inserted into an insertion hole on a guide bush 36. That is, the guide rod 38 is inserted into the insertion hole of the guide bush 36 supported so as to be rotatable with respect to the slide base 33, with the slide base 33 being incorporated into the ejector plate 1 (JP 10-95019 A).

SUMMARY OF THE INVENTION

However, in an ejector apparatus in which the universal nut 6 or the guide bush 36 is rotatable with respect to the slide base 33 in the direction of inclination angle of the lift core 5, when assembling the lower end portion 5c of the lift core 5 or inserting the guide rod 38, the inclination angle of the universal nut 6 or the guide bush 36 is not always the same as the desired inclination angle (K°) at which the lift core 5 is assembled.

If the orientation of the insertion hole of the universal nut 6 is not the same as the desired inclination angle (K°), the orientation must be adjusted so as to match the inclination angle (K°) in assembling the universal nut 6. Since this procedure is performed after incorporating the slide base 33 into the ejector plate 1, it is very time-consuming.

The assembly of the lower end portion 5c of the lift core 5 or the insertion of the guide rod 38 must be performed not only in the first assembly of the ejector apparatus, but also in the reassembly after disassembly for maintenance or the like.

In use, depending on such factors as the shape of a synthetic resin to be molded, the orientation of the universal nut 6 or guide bush 36 with respect to the slide base 33 may be changed such that the inclination angle (K°) of the lift core 5 is greater than the initial setting.

However, in manufacture of this ejector apparatus, there is a limit to widen the inclination angle (K°), for example, beyond 30°, because a conventional integrated slide base is manufactured by shaving a block, thereby making it difficult to expand the rotatable range of the guide bush mounted to this slide base beyond a fixed inclination angle.

Originally, the rotatable range of the guide bush is desirably set such that the limit on the inclination angle is minimized in order to reduce a burden on a user such as additional processing including cutting for avoiding any interference between the guide bush and the slide base. However, the structure of the conventional slide base makes it difficult to make a sufficient space within the slide base during manufacture for avoiding such an interference.

Thus, conventionally, when an additional fine adjustment of the slide base is required, e.g., when the large inclination angle of the lift core is desired, the additional processing such as cutting is performed, and nitriding is further carried out as necessary. However, this additional processing is a burden for a user, and it is most desirable to finish the apparatus requiring no additional processing during manufacture.

On the other hand, in a resin molding mold in which high accuracy is needed, nitriding its suitable surface increases the hardness of the metal surface to improve a wear resistance. As a result, the accuracy may be maintained for a long period of time, and the life of the mold is lengthened. In particular, a surface of the slide base sliding in a slide path while keeping the guide bush rotatable is desirably netrided, in order to improve the wear resistance. Incidentally, the nitriding treatment is the procedure in which nitrogen is introduced into steel or cast iron to form, on the surface thereof, a compound layer of iron and nitrogen and a diffusion layer.

Nevertheless, in view of the necessity of such an additional processing, nitriding treatment is often first performed during additional processing, not during manufacturing. This results in a great burden for a user carrying out additional processing, which is not desirable.

One or more embodiments of the present invention provide an ejector apparatus, in which, in mounting a lift core or guide rod, which is to be installed in an inclined state, to the slide base, the assembly of the apparatus is easily performed regardless of the inclination angle.

One or more embodiments of the present invention provide an ejector apparatus which requires no additional processing for the slide base or other components and which may reduce a user's burden by, for example, the nitriding treatment during manufacture; and a method for manufacturing the ejector apparatus.

One or more embodiments of the present invention may have the following structures.

That is, in one or more embodiments, there is provided an ejector apparatus for moving a lift core which extends through a core constituting a component of a resin molding mold to form an undercut portion in a molded piece and which is installed so as to be capable of moving obliquely with respect to the core surface and in the longitudinal direction, characterized by including:

an ejector plate arranged between the core and a base plate so as to be capable of moving up and down, the base plate being arranged below the core;

a slide path formed in the ejector plate so as to extend in a direction in which a lower end of the lift core makes relative horizontal movement at a time of ascent and descent of the lift core;

a slide base movably arranged in the slide path and coupled to the lower end of the lift core; and a guide rod imparting a moving force within the slide path to the lower end of the lift core at a time of ascent and descent of the ejector plate, wherein the slide base includes a base main body having forked portions at the ends of the base main body, and a guide bush supported by the forked portions so as to be rotatable in an inclining direction of the lift core, wherein the guide bush has a passing hole extending along an axis perpendicular to a rotation axis of the guide bush, through which the guide rod that serves to force the slide base to slide at the time of ascent and descent of the ejector plate is slidably passed, wherein the lower end of the lift core is mounted supportively so as to be rotatable in the inclining direction such that an inclination angle of the guide rod is the same as that of the lift core, wherein rotation-restraining members are provided within the forked portions, which make contact with the guide bush and prevent free rotation of the guide bush in the inclining direction.

The base main body may have two forked portions. In one forked portion, there is arranged the guide bush, and in the other forked portion, there is arranged a shaft coupling supported so as to be rotatable in the inclining direction. Rotation-restraining members may be provided within the other forked portion, which make contact with the shaft coupling and prevent free rotation of the shaft coupling in the inclining direction.

According to embodiments of the present invention, in assembling the ejector apparatus, insertion holes of the guide bush and shaft coupling may be oriented such that their inclination angles are the same as the inclination angles of the lift core and the guide rod, and the guide bush and shaft coupling may be held by a rotation-restraining force from the rotation-restraining members. Accordingly, in mounting the lift core or guide rod, which is to be installed in an inclined state, to the slide base, each assembling procedure may be smoothly performed.

The ejector apparatus may have shaft pins inserted into bearing holes of opposite inner walls of each of the forked portions and rotatably supporting the guide bush and/or shaft coupling. The apparatus may further employ o-rings or washers, which are provided around the shaft pins, as the rotation-restraining members. Since the use of existing o-rings or washers as the rotation-restraining members eliminates the need to design and fabricate the new rotation-restraining members, a low production cost may be achieved.

One or more embodiments of the present invention provides an ejector apparatus for moving a lift core which extends through a core constituting a component of a resin molding mold to form an undercut portion in a molded piece and which is installed so as to be capable of moving obliquely with respect to the core surface and in the longitudinal direction, characterized by including:

an ejector plate arranged between the core and a base plate so as to be capable of moving up and down, the base plate being arranged below the core;

a slide path formed in the ejector plate so as to extend in a direction in which a lower end of the lift core makes relative horizontal movement at a time of ascent and descent of the lift core;

a slide base movably arranged in the slide path and coupled to the lower end of the lift core; and a guide rod imparting a moving force within the slide path to the lower end of the lift core at a time of ascent and descent of the ejector plate, wherein the slide base includes a base main body and a guide bush, the base main body comprising: two opposite spaced-apart side plates formed of a metal having a pre-nitrided surface; and a coupling member coupling the side plates by press-fitting the ends of the coupling member into coupling holes of the side plates: and the guide bush being supported between the two opposite side plates so as to be rotatable in an inclining direction of the lift core, and having a passing hole extending along an axis perpendicular to a rotation axis of the guide bush, wherein the guide rod which serves to force the slide base to slide at the time of ascent and descent of the ejector plate is slidably passed through the passing hole, and wherein the lower end of the lift core is mounted supportively so as to be rotatable in the inclining direction such that an inclination angle of the guide rod is the same as that of the lift core.

Press-fitting means pressurizing and inserting the ends of the coupling member formed of, for example, a metal into supporting holes having inner diameters smaller than an outer diameter of the coupling member.

Assembling the slide base by press-fitting the ends of the coupling member into the coupling holes of the side plates may easily widen a space within the slide base from the beginning of manufacture. Thus, a resin molding mold incorporating this ejector apparatus may be designed more flexibly by a user, and additional processing is rarely required. For example, the guide rod and lift core may be inclined up to 45° by rotation. Such initial setting in which they may be inclined to 45° by rotation almost eliminates the need for a user to further cut a portion of the slide base to avoid an interference with the slide base. Accordingly, the slide base may be nitrided during the initial stage of manufacture. The guide rod or lift core is inclined up to 45° because they longitudinally extend through the slide base.

The coupling holes are circular, and the ends of the coupling member press-fit into these coupling holes may have circular cross sections with diameters larger than those of the coupling holes.

With the circular coupling holes and the circular ends of the coupling member press-fit thereto, when coupling the side plates and coupling member to assemble the slide base, fine adjustment of the side plates to be parallel to each other by their slight rotation may be achieved.

Rotation-restraining members, which make contact with the guide bush and prevent free rotation of the guide bush in the inclining direction, may be provided inside the two side plates.

Shaft pins inserted into bearing holes of opposite inner walls of the forked portion and rotatably supporting the guide bush are provided. Around these shaft pins, o-rings or washers which functions as the rotation-restraining members are provided.

According to embodiments of the present invention, when initially assembling the ejector apparatus, insertion holes of the guide bush and shaft coupling may be oriented in advance such that the inclination angles are the same as the inclination angles of the lift core and the guide rod, and the guide bush and shaft coupling may be held by a restraining force from the rotation-restraining members. Accordingly, these components may be smoothly assembled. In particular, even when inserting the guide rod into the insertion hole of the guide bush after incorporating the slide base into the ejector plate, the insertion hole may be easily oriented so as to conform to the predetermined inclination angle, enabling the smooth assembly.

When reassembling the components after disassembly, the inclination angle is maintained as initially assembled, thereby eliminating the need to conform the orientation of the insertion hole to the predetermined inclination angle.

With the slide base assembled by coupling the two opposite side plates by the coupling member, a wide space within the slide base may be easily obtained at the beginning, enabling a user to flexibly design a mold. In this manner, cutting or nitriding the slide base by the user is not required, reducing burden on the user.

DETAILED DESCRIPTION

Embodiments for carrying out the present invention will now be described based on the accompanying drawings to illustrate the present invention in detail.

First Embodiment

Figure 1:
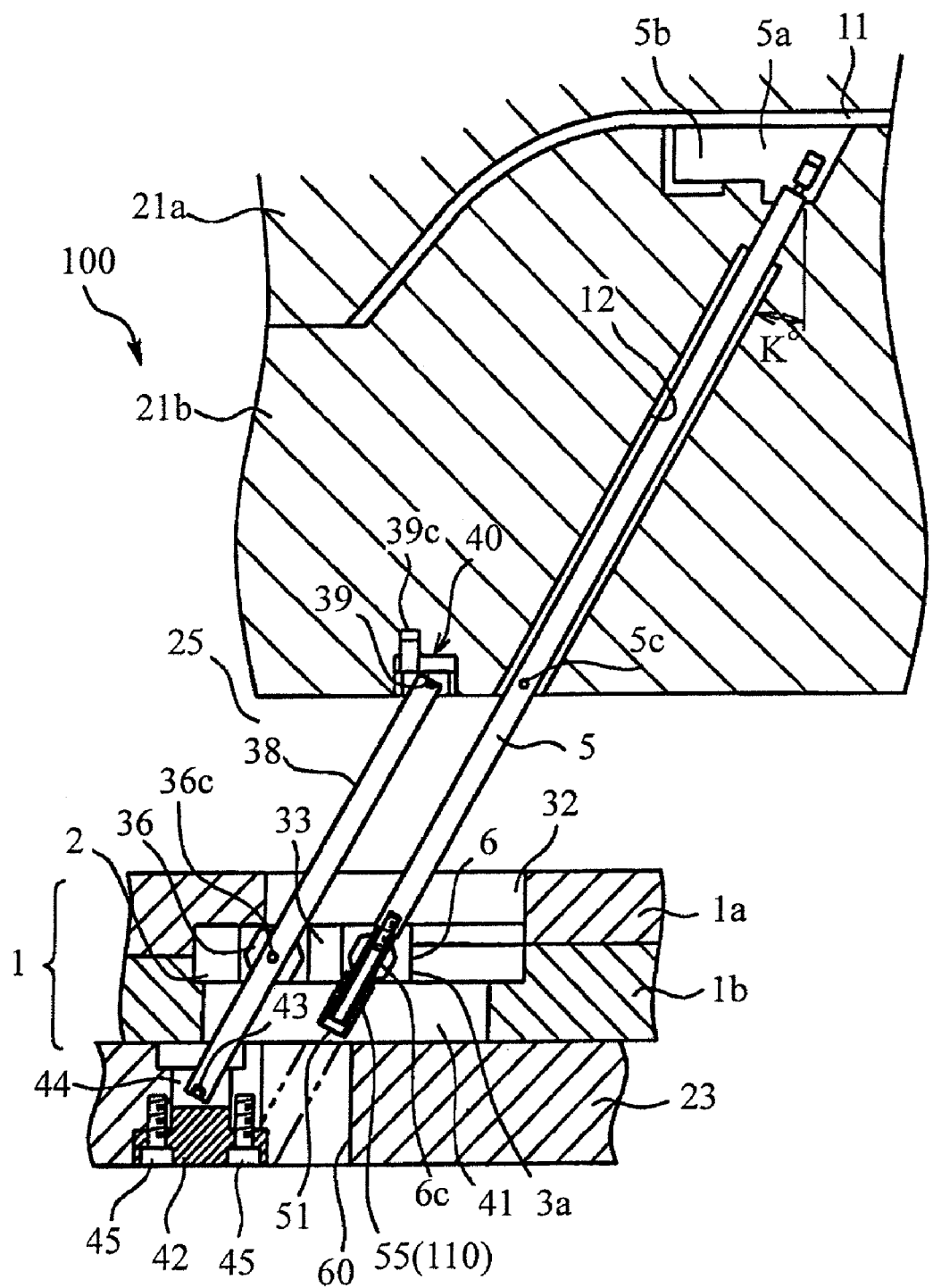
FIG. 1 is a schematic sectional view of an ejector apparatus according to one or more embodiments of the present invention.
Figure 2:
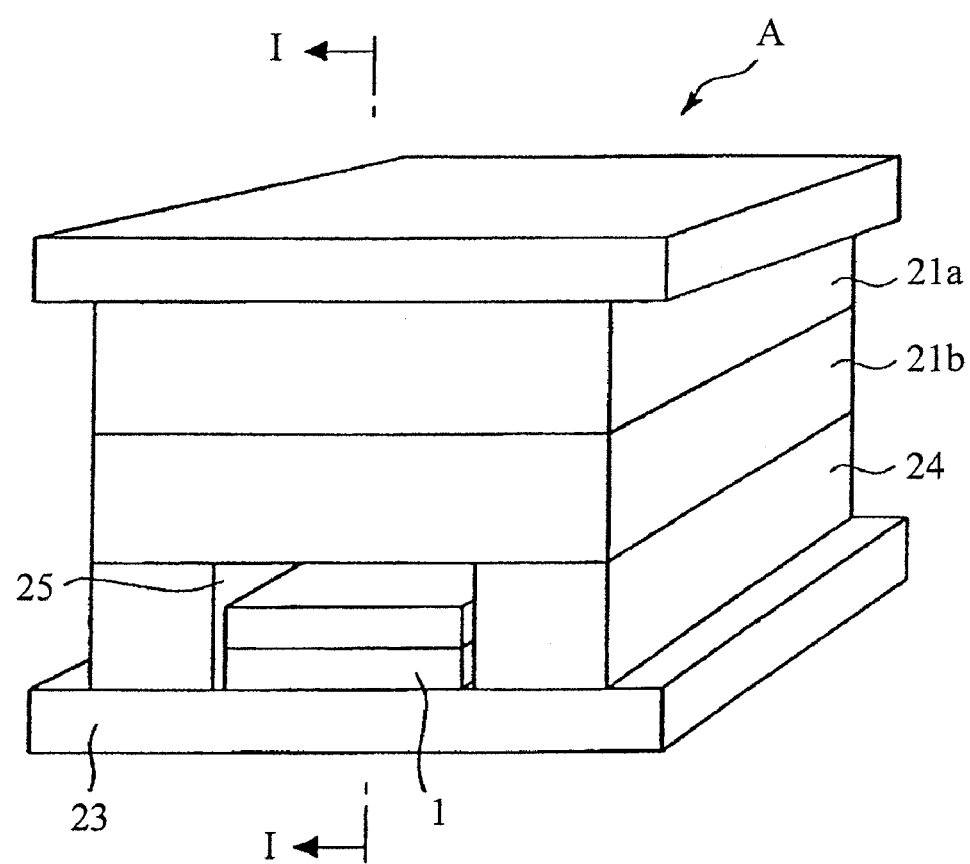
FIG. 2 is an overall perspective view of a resin molding mold equipped with the ejector apparatus as shown in FIG. 1.

FIG. 1 shows an ejector apparatus 100 according to a first embodiment of the present invention, and FIG. 2 shows an entire resin molding mold incorporating the ejector apparatus of FIG. 1.

[Resin Molding Mold A]

First, a resin molding mold A equipped with this ejector apparatus 100 will be described. The general structure of this mold A is similar to a common resin molding mold, and includes a core 21$b$ arranged under an upper mold main body 21$a$, with the mold main body 21$a$ and the core 21$b$ defining a resin molding space 11 (FIG. 1). Note that FIG. 1 is a partial sectional view, taken along the line I-I, of the resin molding mold A shown in FIG. 2.

Below the core 21$b$, there is arranged a base plate 23, and, between the core 21$b$ and the base plate 23, there are separately arranged spacers 24 on either side, thus forming a chamber 25 between the spacers 24. In this chamber 25, the ejector plate 1 is arranged so as to be vertically movable.

In this resin molding mold A, there is provided an elongate lift core 5 which is passed through an angle setting hole 12 (inclined by an angle K°) of the core 21$b$ constituting the resin molding mold A to form an undercut portion in a molded piece formed in the above-mentioned resin molding space 11 and which extends obliquely and is longitudinally movable.

The upper end portion of this lift core 5 functions as a mold portion 5$a$ which cooperates with the core 21$b$ to form a molded piece, and, by the side of this upper portion, there is formed a protrusion 5$b$ for integrally forming an L-shaped flange portion (which also constitutes a part of the undercut portion) in the molded piece. This lift core 5 is passed through a guide hole (angle setting hole) 12 formed obliquely in the core 21$b$, extending downwardly from the core 21$b$.

This lift core 5 is caused to slide vertically in the angle setting hole 12 of the core 21$b$ by the ejector apparatus 100 at an inclination angle K°. The ejector apparatus 100 used for this purpose includes the ejector plate 1 composed of two plates 1$a$ and 1$b$ that are superimposed one upon the other.

Formed in the ejector plate 1 is a slide path 32, which extends in the direction in which the lower end of the lift core 5 makes relative horizontal movement when it ascends and descends. A slide base 33 is slidably arranged in this slide path 32, and the lower end portion of the lift core 5 is retained by one end portion of the slide base 33 with respect to the sliding direction thereof. The slide base 33 will be described below in detail.

Further, the ejector apparatus 100, which raises and lowers the lift core 5, is equipped with an angular guide rod (hereinafter simply referred to as the guide rod) 38 which is adjacent to the lift core 5 and which is parallel thereto. At either end of this guide rod 38, there is formed a V-shaped cutout 39. The upper end portion of the guide rod 38 is supported by engaging one cutout 39 thereof with a pin 40.

Figure 3:
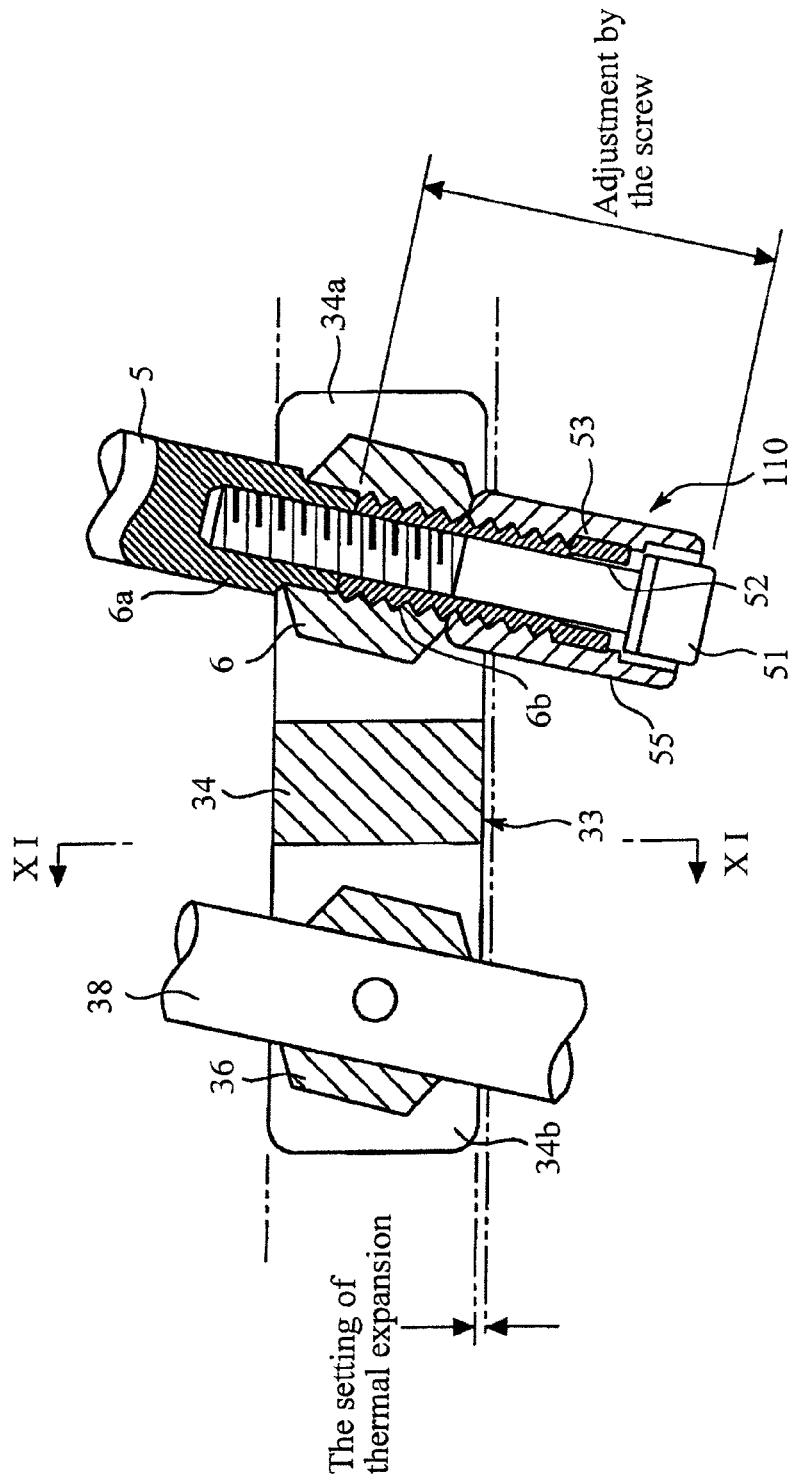
FIG. 3 is an enlarged sectional view of a slide base constituting the ejector apparatus shown in FIG. 1.
Figure 4:
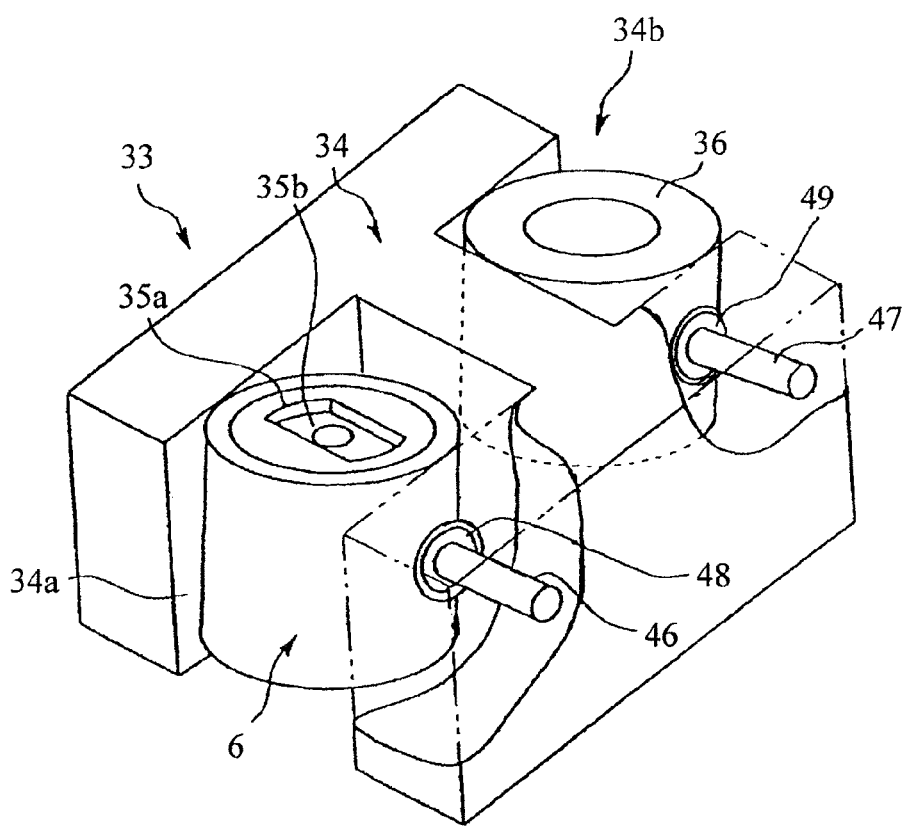
FIG. 4 is an enlarged perspective view of the slide base.

Incidentally, FIGS. 3 and 4 show the detailed structure of the slide base 33 slidably provided in the above-mentioned ejector plate 1.

[Slide Base 33]

This slide base 33 includes a base main body 34 having at its ends with respect to the sliding direction of the slide base 33 forked portions 34$a$ and 34$b$, respectively, which are U-shaped in plan view. In one forked portion 34$a$ of this base main body 34, there is arranged a shaft coupling (universal nut) 6, and in the other forked portion 34$b$, there is arranged a guide bush 36.

The universal nut 6 arranged in the forked portion 34$a$ has two shaft pins 46 extending toward opposing wall surfaces of the forked portion 34$a$ and rotatably engaging the wall surfaces, and is rotatably mounted to the forked portion 34$a$ by the two shaft pins 46. The shaft pins 46 may extend through bearing holes (not shown) in the forked portion, and may be inserted, from the outside of the slide base 33, toward a fixation hole (not shown) in the universal nut 6.

The guide bush 36 arranged in the forked portion 34$b$ has two shaft pins 47 extending toward opposing wall surfaces of the forked portion 34$b$ and rotatably engaging the wall surfaces, and is rotatably mounted to the forked portion 34$b$ by the two shaft pins 47.

Figure 6:
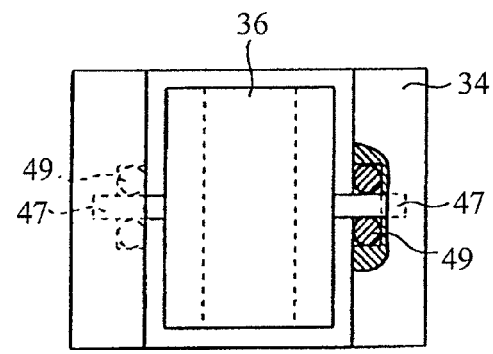
FIG. 6 is a fragmentary view taken along the line XI-XI of FIG. 3.

As shown in FIG. 6, receiving holes (o-ring receiving holes) housing o-rings (rotation-restraining members) 49 inserted over the shaft pins 47, and holes for rotatably engaging the shaft pins 47 are provided in the opposing wall surfaces of the forked portion 34b. O-rings 49 are made of synthetic rubber (e.g., nitrile rubber, or fluororubber), and the thickness of the o-rings 49 is dimensioned such that they frictional engage both the guide bush 36 in the forked portion 34b and the inner walls of the forked portion 34b. Further, o-rings 49 frictional engage the receiving holes (o-ring receiving holes) at their outer diameter surfaces and the shaft pins 47 at their inner diameter surfaces. While the rotation of the guide bush 36 is prevented by rotation-restraining force generated by frictional engagement, this restraining force suitably permits manually rotating the guide bush 36.

Similar to the guide bush 36, for the universal nut 6 arranged in the forked portion 34a, receiving holes (o-ring receiving holes) housing o-rings (rotation-restraining members) 48 inserted over the shaft pins 46, and holes for rotatably engaging the shaft pins 46 are provided in the opposing wall surfaces of the forked portion 34a. O-rings 48 are made of synthetic rubber (e.g., nitrile rubber, or fluororubber), and the thickness of o-rings 48 is dimensioned such that they frictional engage both the universal nut 6 in the forked portion 34a and the inner walls of the forked portion 34a. Further, o-rings 48 frictional engage the receiving holes (o-ring receiving holes) at their outer diameter surfaces and the shaft pins 46 at their inner diameter surfaces. The rotation of the universal nut 6 is prevented by rotation-restraining force generated by frictional engagement. This restraining force suitably permits manually rotating the guide bush 36 or universal nut 6 and stopping them at any position.

The slide base 33, universal nut 6, guide bush 36, and o-rings 48, 49 are pre-assembled as a unit.

Formed at the upper end of the universal nut 6 is a recess 35a for receiving the lower end portion of the lift core 5. Further, the universal nut 6 is equipped with a through-hole 35b having a central axis perpendicular to the rotation axis of the universal nut 6 and matched with the center line of the recess 35a mentioned above. The lower end portion of the lift core 5 is supported by an adjustment coupling 110 so as to be extendable in the longitudinal direction and rotatable in the inclining direction with respect to the base main body 34.

[Guide Rod 38]

Further, the guide bush 36 rotatably mounted to the forked portion 34b of the base main body 34 has a passing hole extending along an axis perpendicular to the rotation axis of the guide bush 36, and the above-mentioned guide rod 38 is slidably inserted into this passing hole.

The guide rod 38, which is supported at its upper end by a guide holder 40 and which is passed through the passing hole of the guide bush 36 of the slide base 33, extends toward the base plate 23 through a clearance hole 41 formed in the lower plate 1b, and the cutout at its lower end is engaged with a pin 43 of a holder bush 42 mounted to the base plate 23, whereby the lower end of the guide rod is supported and secured.

This holder bush 42 is inserted into an opening 44 formed in the base plate 23 and is secured in position by bolts 45. As described above, the guide rod 38 is arranged so as to be parallel to the lift core 5, that is, inclined by the same angle as the lift core 5. As is apparent from FIG. 1, the distance between the core 21b and the base plate 23 or the height (that is, the height of the spacers 24 (See FIG. 2)) is fixed, so that the setting of the angle of the guide rod 38 depends upon the horizontal positional relationship, that is, the distance, between the pin 39 provided in the guide holder 40 and the pin 43 provided in the holder bush 42. In FIG. 1, the intersection points (axial center points) 39 and 36c of the guide rod 38 and the intersection points (axial center points) 5c and 6c of the lift core 5 form a parallelogram.

By thus forming a parallelogram, it is possible to force the ejector plate 1 to move vertically and to force the slide base 33 to move horizontally, with the axial center points 39, 36c, 5c, and 6c of the guide rod 38 and the lift core 5 maintaining the same inclination angle (that is, keeping these components parallel to each other). At this point, while the slide base 33 simultaneously receives horizontal and vertical moving forces, and a force to rotate the slide base 33 within the slide path 32 is exerted, the slide base 33 can be kept parallel to the slide path 32 due to the self-alignment function which enables the four axial center points to form a parallelogram.

[Adjustment Coupling 110]

Next, the adjustment coupling 110 will be described with reference to FIGS. 1, 3, and 5.

The adjustment coupling 110 comprises the universal nut 6 which is a support member supporting the lower end portion 5c of the lift core 5 on the base main body 34 and rotatable in the inclining direction, and an adjusting screw 53 abutting the lower end portion 5c of the lift core 5. The adjustment coupling 110 further comprises a bolt member (also referred to as cap bolt) 51 and a washer (spacer collar) 52 for fastening the adjusting screw 53 and the lower end portion 5c of the lift core 5 to each other, and a lock nut 55 to be threadedly engaged with the outer peripheral surface of the adjusting screw 53 until it abuts the other end portion of the universal nut 6.

The universal nut 6 arranged in the forked portion 34a is rotatably mounted to opposing wall surfaces of the forked portion 34a by means of the shaft pins 46. Further, the universal nut 6 is equipped with a through-hole 6b in alignment with the center axis thereof which is perpendicular to the rotation axis thereof. A threaded portion is formed in the inner peripheral surface of the through-hole 6b.

Figure 5:
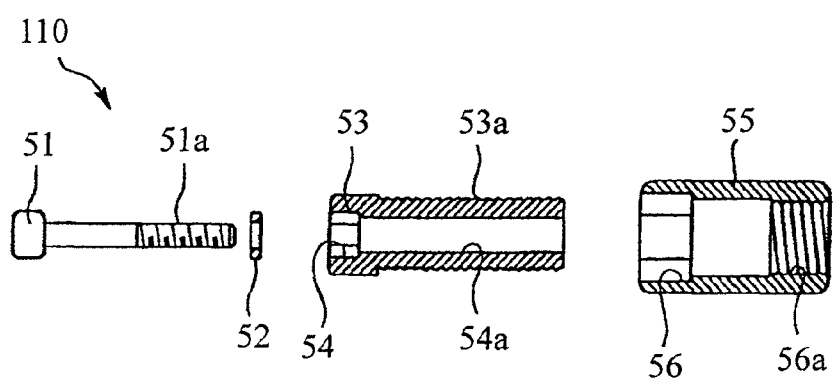
FIG. 5 is a longitudinal sectional view of a component constituting an adjustment coupling.

As shown in FIG. 5, the adjusting screw 53 is a hollow cylinder having a threaded portion 53a on its outer peripheral surface. Further, this adjusting screw 53, which is formed as a hollow cylinder, has an inner hexagonal wrench hole 54 in the inner peripheral surface at one end thereof, is threadedly passed through the through-hole 6b of the universal nut 6, and abuts the lower end portion 5c of the lift core 5.

The adjusting screw 53 and the lower end portion 5c of the lift core 5 are fastened together by the cap bolt 51 after completion of fine adjustment of the axial length of the lift core 5. When fastening with this cap bolt 51, the spacer collar 52 is inserted between the cap bolt 51 and the adjusting screw 53. This is done for the purpose of preventing the hexagonal hole of the adjusting screw 53 from being crushed.

The locknut 55 is a hollow cylinder having a threaded portion 56a in an inner peripheral surface thereof. Further, this lock nut 55, which is formed as a hollow cylinder, has an inner hexagonal wrench hole 56 in the inner peripheral surface at one end thereof.

Next, the respective operations of assembling the lower end portion 5c of the lift core 5 and of inserting the guide rod 38 will be described, among other operations of assembling the ejector apparatus 100.

The rotation of the universal nut 6 and guide bush 36 is prevented by rotation-restraining force generated from frictional engagement of o-rings 47, 48, thereby maintaining the angle K°. Thus, when assembling the ejector apparatus 100, the universal nut 6 is positioned in advance based on the designed inclination angle K° of the lift core 5 such that the angle between the vertical line of the slide base 33 and the axis of the insertion hole on the top surface of the universal nut 6 is angle K°. Similarly, the guide bush 36 is also positioned in advance such that the angle between the vertical line of the slide base 33 and the axis of the insertion hole of the guide bush 36 is angle K°.

[Assembly of the Lower End Portion of the Lift Core 5]

The operation of assembling the lower end portion of the lift core 5 is now described.

When fixing the lower end portion of the lift core 5 to the slide base 33, the lower end portion of the lift core 5 may be smoothly inserted into the insertion hole on the top surface of the universal nut 6, because the inclination angle of the insertion hole on the top surface of the universal nut 6 is set so as to be the same as the inclination angle K° of the lift core 5. Then, the rod length of the lift core 5 is adjusted using the adjustment coupling 110 for the assembly. To the extent of threaded adjustment shown in FIG. 3, the rod length of the lift core 5 may be adjusted. In this manner, the rod of the lift core 5 manufactured based on the design value can be adjusted in length without being cut after the assembly thereof within the adjustment range for the adjustment coupling 110, and for example, it is possible to absorb the thermal expansion (FIG. 3) of the rod of the lift core. After adjustment of the rod length of the lift core 5, the slide base 33 is incorporated into the ejector plate 1.

[Inserting the Guide Rod 38]

Next, the operation of inserting the guide rod 38 into the insertion hole of the guide bush 36 is described. In this operation, the guide rod 38 is inserted into the insertion hole of the guide bush 36 supported so as to be rotatable with respect to the slide base 33, with the ejector plate 1 incorporating the slide base 33.

In this operation of inserting the guide rod 38 into the insertion hole of the guide bush 36, the inclination angle of the insertion hole of the guide bush 36 has been already set and maintained to be the same as the inclination angle K° of the guide rod 38. Thus, even if the slide base 33 has been incorporated into the ejector plate 1, the operation of orienting the insertion hole at the angle K° may be omitted, and the guide rod 38 may be smoothly inserted into the insertion hole of the guide bush 36.

Also in reassembling the ejector apparatus 100 after disassembly, each inclination angle of the universal nut 6 and guide bush 36 is maintained as initially assembled, such that the operation of reorienting the insertion hole may be omitted. Thus, each assembly operation may be further smoothly performed.

Second Embodiment

Figure 7:
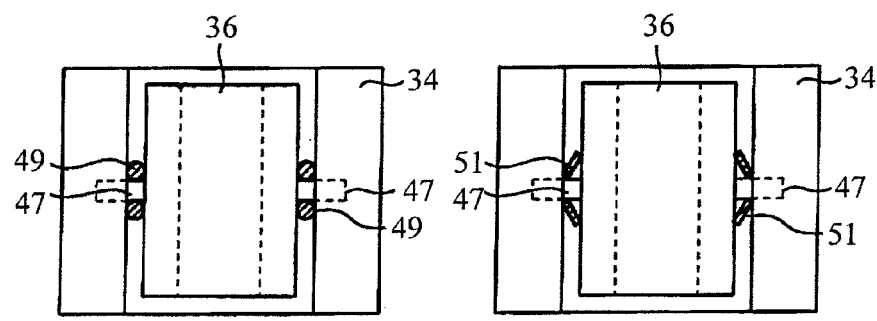
FIGS. 7($a$) and 7($b$) are enlarged side views of first and/or second friction members according to one or more embodiments of the present invention.

While, in the above-described first embodiment, the o-rings, rotation-restraining members, were housed in the o-ring receiving holes, the rotation-restraining members may not be housed in the o-ring receiving holes. For example, in one or more embodiments of the rotation-restraining members, as shown in FIG. 7(a), the thickness of the o-rings 48, 49 inserted over the shaft pins 46, 47 may be configured such that the o-rings 48, 49 are within the forked portions 34a, 34b, and frictional engage both the universal nut 6 (or the guide bush 36) and the inner walls of the forked portion 34a, 34b. The rotation of the universal nut 6 (or the guide bush 36) is prevented by rotation-restraining force generated from the frictional engagement.

[Rotation-Restraining Members]

Rotation-restraining members other than the o-rings made of synthetic rubber may be used. For example, as shown in FIG. 7(b), spring washers 51 may be used instead of the o-rings. That is, conical spring washers 51 inserted over the shaft pins 46, 47 may be configured so as to be within the forked portions 34a, 34b, and so as to frictional engage the universal nut 6 (or the guide bush 36) at one of circular faces of the conical spring washers 51 and the inner walls of the forked portions 34a, 34b at the other face. The rotation of the universal nut 6 (or the guide bush 36) is prevented by rotation-restraining force generated from the frictional engagement of the conical spring washers 51. When using such washers, wave washers, spring washers, toothed lock washers, or the like may be also used.

Third Embodiment

While the above-described first embodiment uses the rotation-restraining members inserted over the shaft pins 46, 47, the rotation-restraining members may not be inserted over the shaft pins 46, 47. For example, as the enlarged side view of the universal nut 6 (or the guide bush 36) in FIG. 8(a) shows one or more embodiments of the first and/or second friction members, total of 4 blocks 71 made of synthetic rubber within the forked portions 34a, 34b, which engage both the universal nut 6 (or the guide bush 36) and the inner walls of the forked portions 34a, 34b, may be attached at 180-degree symmetrical sites of the shaft pins 46, 47.

Fourth Embodiment

Figure 8:
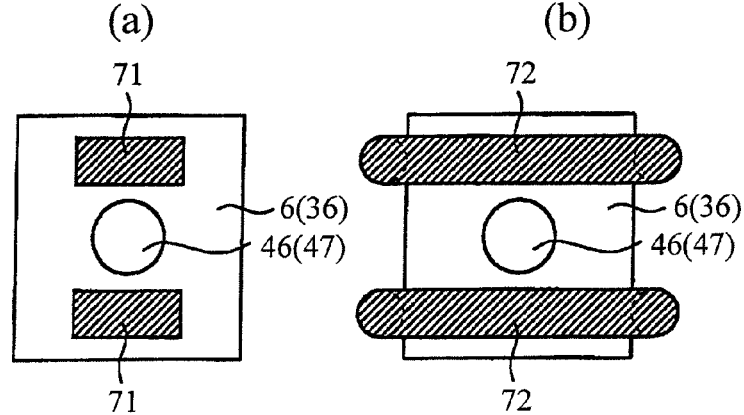
FIGS. 8($a$) and 8($b$) are enlarged side views of first and/or second friction members according to one or more embodiments of the present invention.

As the enlarged side view of the universal nut 6 (or the guide bush 36) in FIG. 8(b) shows one or more embodiments of the rotation-restraining members, two bands 72 made of synthetic rubber within the forked portions 34a, 34b, which have the thickness for engaging both the universal nut 6 (or the guide bush 36) and the inner walls of the forked portion 34a, 34b, may be wound around the universal nut 6 (or the guide bush 36) from the above and below of the shaft pins 46, 47. The bands 72 frictional engage the universal nut 6 (or the guide bush 36), and frictional engage the inner walls of the forked portions 34a, 34b at the other face.

While, in each of the above-described embodiments, the shaft coupling (universal nut) 6 is rotatably arranged in the forked portion 34a of the base main body 34, the present invention may include one or more embodiments in which the lower end portion of the lift core 5 is directly rotatably locked to the base main body 34 without using the universal nut 6. In such embodiments, the rotation of only the guide bush 36 is prevented by rotation-restraining force generated from the frictional engagement of the rotation-restraining members.

Fifth Embodiment

Figure 9:
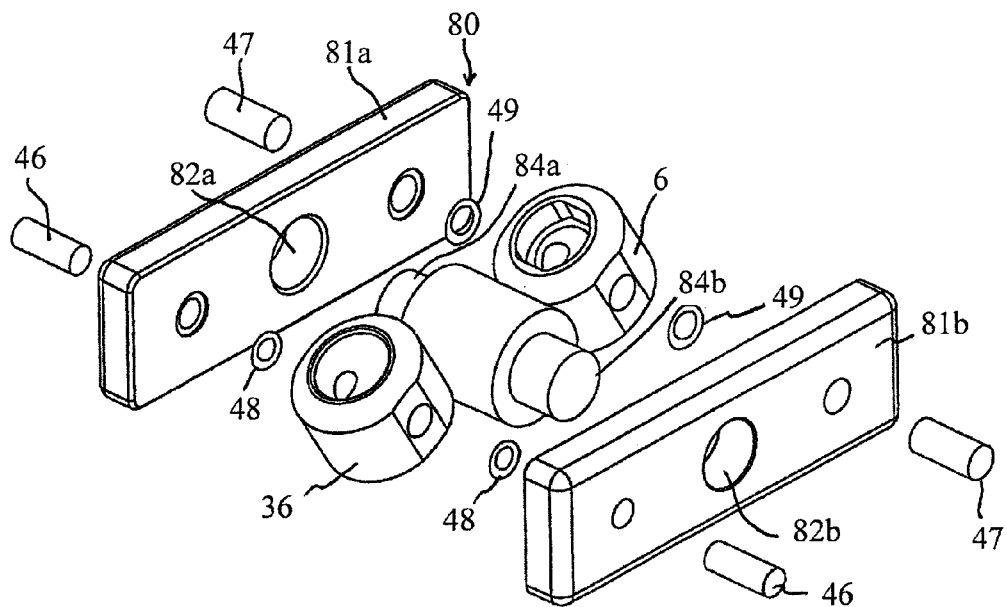
FIG. 9 is an exploded perspective view of a slide base according to a fifth embodiment.
Figure 10:
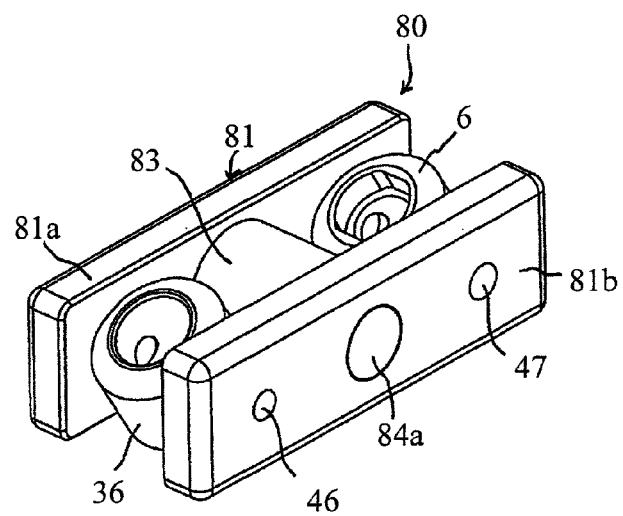
FIG. 10 is an overall perspective view of the slide base according to the fifth embodiment.
Figure 11:
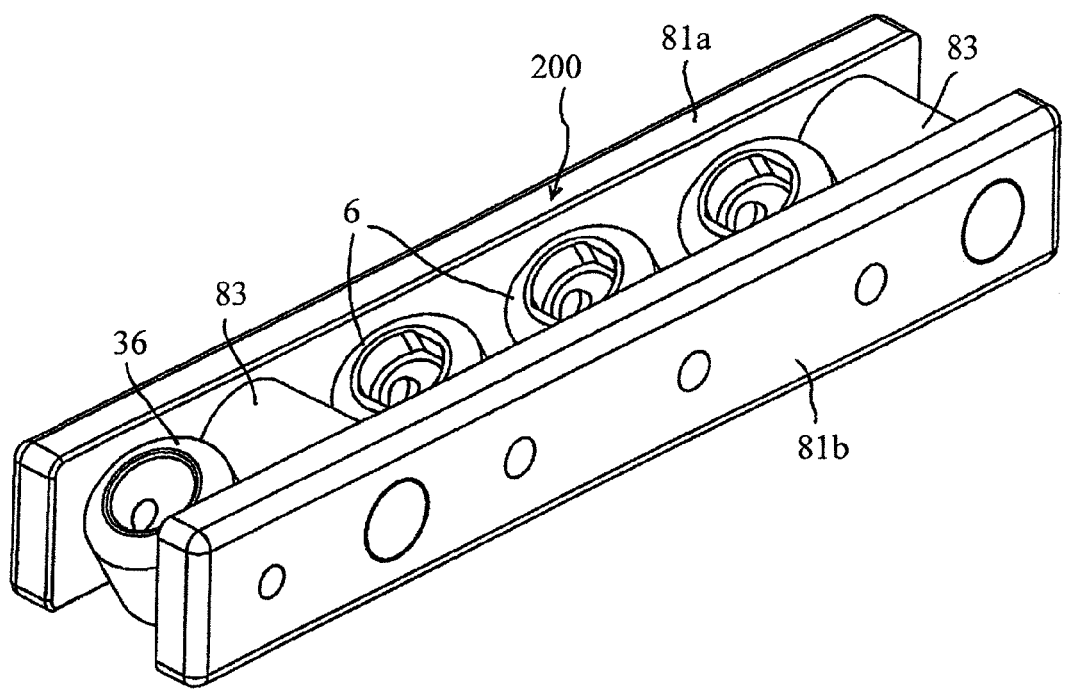
FIG. 11 is a perspective view of a slide base of an ejector apparatus for a plurality of lift cores.

A fifth embodiment is described based on FIGS. 9 through 11.

Since a slide base 80 in this fifth embodiment has the same structure as the first embodiment except for a base main body 81, the structure different from the first embodiment is only described, and the components identical to those in the first embodiment, which are assigned the same reference numbers as the first embodiment, are not described.

[Slide Base]

In the slide base 80 shown in FIGS. 9 and 10, the base main body 81 having an H-shaped configuration as a whole is formed of steel materials having a pre-nitrided surface. Nitriding treatment is the procedure in which nitrogen is introduced into the steel materials to form, on the surface thereof, a compound layer of iron and nitrogen, and a diffusion layer. Such a nitriding treatment increases the surface hardness of the slide base 80 to improve the wear resistance. Therefore, the accuracy may be maintained for a long period of time, thereby, the life as an ejector may be lengthened. In particular, since the slide base 80 slides within the slide path while holding the guide bush to be rotatable, and is easily worn away, the nitriding treatment is preferably performed.

Left and right rectangular side plates 81a, 81b of the base main body 81 are spaced apart oppositely. These side plates 81a, 81b have respective circular coupling holes 82a, 82b provided in center portions thereof.

A coupling member 83, which is generally cylindrical in shape, is also provided. Its ends 84a, 84b are smaller than its central portion in diameter. These ends 84a, 84b of the coupling member 83 have the outer diameters slightly larger than the inner diameters of the coupling holes 82a, 82b provided in the side plates 81a, 81b, and are press-fit into respective coupling holes 82a, 82b. This press-fitting causes the side plates 81a, 81b to be coupled by the coupling member 83 at a certain distance to form H-shaped base main body 81. The above-mentioned nitriding treatment may be performed on the surface of the base main body 81.

As shown in FIG. 10, the guide bush 36 and universal nut 6 are rotatably supported on either side of the centered coupling member 83 between the two opposite side plates 81a and 81b of the nitrided base main body 81. At this point, only the coupling member 83 is within the space between side plates 81a and 81b, and the rotation of the guide bush 36 and universal nut 6 is not impeded. Therefore, their inclination angles may be freely set, and the selected inclination angles are maintained by the rotation-restraining members 48, 49 consisted of o-rings or washers.

As described above, the completed slide base 80 has been already nitrided, and the inclination angles of the guide bush 36 and universal nut 6 may be easily modified at any time, such that need for additional processing such as cutting or nitriding the base main body 81 by a user may be almost excluded.

Further, the base main body 81 may have accuracy equal to that of an integrated base main body manufactured by shaving a block, and its strength similar to that of the integral base main body may be easily achieved.

In addition, for example, as shown in FIG. 11, according to embodiments of the present invention, even an ejector apparatus for a plurality of juxtaposed lift cores (which is suitable for a molded piece with a plurality of undercut portions), which supports a plurality of universal nut 6 so as to be rotatable on an elongate slide base 200, may be easily manufactured. Such an apparatus is extremely difficult to manufacture, when using a conventional integral base main body. In the slide base 200 of one or more embodiments, the side plates 81a, 81b are coupled by two coupling members 83, and three universal nuts 6 are juxtaposed between the coupling members 83, 83.

Figure 12:
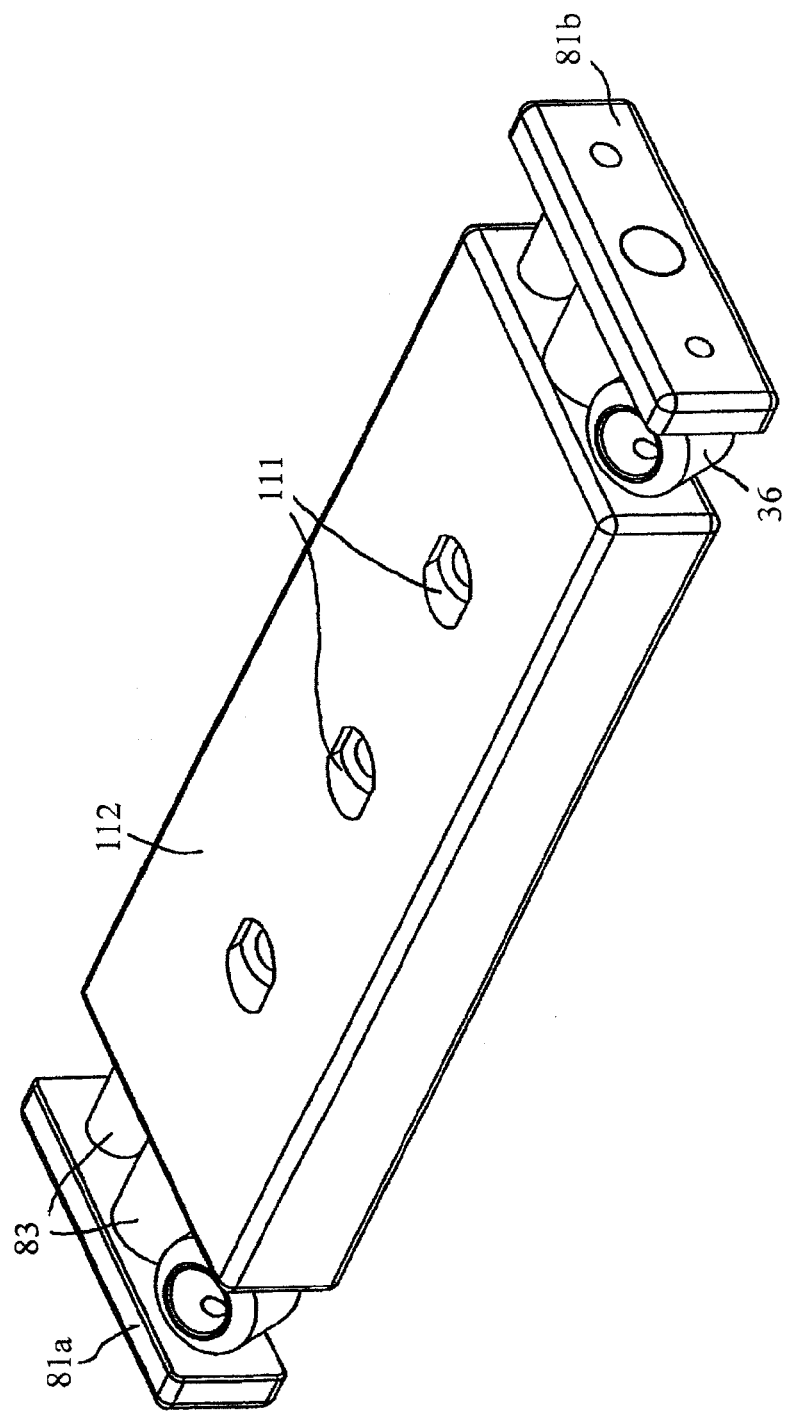
FIG. 12 is a perspective view of another slide base of an ejector apparatus for a plurality of lift cores.
Figure 13:
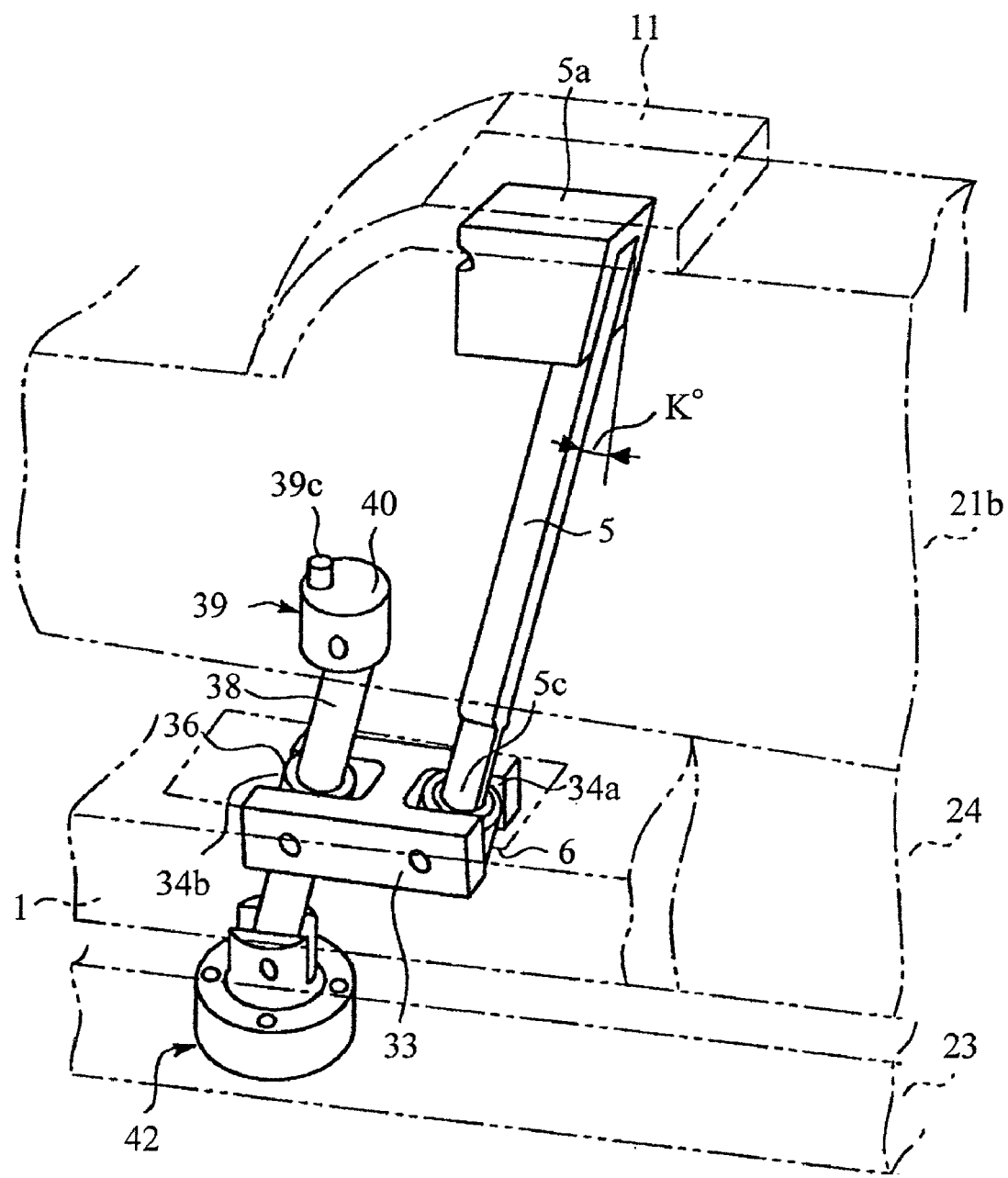
FIG. 13 is a perspective view showing a whole structure of a conventional ejector apparatus.

The example shown in FIG. 12 may be suited to a resin molding mold with undercut portions juxtaposed in the direction of 90 degree displacement compared to the example of FIG. 11. In this example, a central base plate 112 is provided with a plurality of holes 111 fixing a plurality of lift cores. Each of the side plates 81a, 81b is coupled to the base plate 112 by the coupling members 83, and the guide bushes 36 are rotatably supported between the base plate 112 and each of the side plates 81a, 81b. Although such a slide base is also extremely difficult to manufacture by shaving a block, this slide base may be easily manufactured according to one or more embodiments of the present invention.

As mentioned above, according to one or more embodiments of the present invention, the ejector apparatus may be easily configured so as to meet various needs in resin molding molds, thereby widening the application range for resin molding.

One or more embodiments of the present invention may be incorporated into the resin molding mold, and used to manufacture the molded piece with the undercut portion. One or more embodiments of the present invention actively moves the lower end portion of the lift core horizontally at a time of ascent and descent of the ejector plate, and actively moves the lift core longitudinally with the aid of a resultant force of an ascent force and horizontal moving force of the ejector plate. Thus, the use of one or more embodiments of the present invention prevents rubbing between the lift core and the passing hole opening edge of the core, and restrains the wear of the lift core, such that the volume of the undercut portion may be increased compared to the conventional apparatus.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

The invention claimed is:

1. An ejector apparatus for moving a lift core which extends through a core constituting a component of a resin molding mold to form an undercut portion in a molded piece and which is installed so as to be capable of moving obliquely with respect to the core surface and in the longitudinal direction, comprising:
   an ejector plate arranged between the core and a base plate so as to be capable of moving up and down, the base plate being arranged below the core;
   a slide path formed in the ejector plate so as to extend in a direction in which a lower end of the lift core makes relative horizontal movement at a time of ascent and descent of the lift core;
   a slide base movably arranged in the slide path and coupled to the lower end of the lift core;
   a guide rod imparting a moving force within the slide path to the lower end of the lift core at a time of ascent and descent of the ejector plate; and
   an adjustment coupling supporting the lower end of the lift core such that the lift core is extendable in the longitudinal direction,
   wherein the slide base includes a base main body having forked portions at the ends of the base main body, and a guide bush supported by the forked portions so as to be rotatable in an inclining direction of the lift core,
   wherein the guide bush has a passing hole extending along an axis perpendicular to a rotation axis of the guide bush, through which the guide rod that serves to force the slide base to slide at the time of ascent and descent of the ejector plate is slidably passed,
   wherein the lower end of the lift core is mounted supportively so as to be rotatable in the inclining direction such that an inclination angle of the guide rod is the same as that of the lift core,
   wherein the base main body has two forked portions, with the guide bush being arranged in one forked portion, and a shaft coupling supported so as to be rotatable in the inclining direction being arranged in the other forked portion, and
   wherein rotation-restraining members are provided within the other forked portions, which make contact with the shaft coupling and prevent free rotation of the shaft coupling in the inclining direction.

2. The ejector apparatus of claim 1, further comprising:
shaft pins inserted into bearing holes of opposite inner walls of each of the forked portions and rotatably supporting the guide bush and/or shaft coupling,
wherein the rotation-restraining members are o-rings or washers which are provided around the shaft pins.

3. The ejector apparatus of claim 1, further comprising:
shaft pins inserted into bearing holes of opposite inner walls of the forked portion and rotatably supporting the guide bush,
wherein the rotation-restraining members are washers which are provided around the shaft pins.

4. An ejector apparatus for moving a lift core which extends through a core constituting a component of a resin molding mold to form an undercut portion in a molded piece and which is installed so as to be capable of moving obliquely with respect to the core surface and in the longitudinal direction, comprising:
an ejector plate arranged between the core and a base plate so as to be capable of moving up and down, the base plate being arranged below the core;
a slide path formed in the ejector plate so as to extend in a direction in which a lower end of the lift core makes relative horizontal movement at a time of ascent and descent of the lift core;
a slide base movably arranged in the slide path and coupled to the lower end of the lift core; and
a guide rod imparting a moving force within the slide path to the lower end of the lift core at a time of ascent and descent of the ejector plate; and
an adjustment coupling supporting the lower end of the lift core such that the lift core is extendable in the longitudinal direction,
wherein the slide base includes a base main body having forked portions at the ends of the base main body and a guide bush,
the base main body comprising: two opposite spaced-apart side plates formed of a metal having a pre-nitrided surface; and a coupling member coupling the side plates by press-fitting the ends of the coupling member into coupling holes of the side plates: and
the guide bush being supported between the two opposite side plates so as to be rotatable in an inclining direction of the lift core, and having a passing hole extending along an axis perpendicular to a rotation axis of the guide bush,
wherein the guide rod which serves to force the slide base to slide at the time of ascent and descent of the ejector plate is slidably passed through the passing hole,
wherein the lower end of the lift core is mounted supportively so as to be rotatable in the inclining direction such that an inclination angle of the guide rod is the same as that of the lift core, and
wherein rotation-restraining members are provided within the forked portions, which make contact with the guide bush and prevent free rotation of the guide bush in the inclining direction.

5. The ejector apparatus of claim 4, wherein the coupling holes are circular, and wherein the ends of the coupling member press-fit into the coupling holes have circular cross sections with diameters larger than those of the coupling holes.

6. The ejector apparatus of claim 4, wherein rotation-restraining members, which make contact with the guide bush and prevent free rotation of the guide bush in the inclining direction, are provided inside the two side plates.

7. The ejector apparatus of claim 4, further comprising:
shaft pins inserted into bearing holes of opposite inner walls of the forked portion and rotatably supporting the guide bush,
wherein o-rings or washers, which functions as the rotation-restraining members, are provided around the shaft pins.

* * * * *